US012752804B2

(12) United States Patent
Raikar et al.

(10) Patent No.: US 12,752,804 B2
(45) Date of Patent: Oct. 6, 2026

(54) ASYMMETRIC REDUNDANCY SYSTEM FOR COMPUTATION ON AUTONOMOUS VEHICLES

(71) Applicant: Torc Robotics, Inc., Blacksburg, VA (US)

(72) Inventors: Akshay Pai Raikar, Blacksburg, VA (US); Makarand Phatak, Blacksburg, VA (US); Joseph R. Fox-Rabinovitz, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 160 days.

(21) Appl. No.: 18/647,493

(22) Filed: Apr. 26, 2024

(65) Prior Publication Data

US 2025/0333069 A1 Oct. 30, 2025

(51) Int. Cl.
*B60W 50/023* (2012.01)
*B60W 50/04* (2006.01)
*B60W 60/00* (2020.01)

(52) U.S. Cl.
CPC ............ *B60W 50/04* (2013.01); *B60W 60/00* (2020.02)

(58) Field of Classification Search
CPC .... B60W 50/04; B60W 60/00; B60W 50/023; B60W 2050/0215; B60W 2050/0292; B60W 50/032
See application file for complete search history.

(56) References Cited

U.S. PATENT DOCUMENTS

| | | | | |
|---|---|---|---|---|
| 11,153,122 | B2 * | 10/2021 | Dubey | H04L 43/20 |
| 2019/0205218 | A1 * | 7/2019 | Bailey | G06F 11/1658 |
| 2020/0017114 | A1 * | 1/2020 | Santoni | G06F 11/1641 |
| 2021/0394770 | A1 * | 12/2021 | Rocha | B60W 60/00186 |
| 2022/0057798 | A1 * | 2/2022 | Costin | H04N 7/181 |

* cited by examiner

*Primary Examiner* — Masud Ahmed
(74) *Attorney, Agent, or Firm* — Armstrong Teasdale LLP

(57) ABSTRACT

A system and method for enabling asymmetric computing redundancy are provided. The system includes a plurality of computing systems with an autonomy system, each comprising a memory device and a processor. The processors write state data to their respective state memory devices and receive data from the autonomy system. An auxiliary computing system functions as a monitor module or sensor suite processor that detects conditions such as processor malfunctions, auxiliary computing failures, or data corruption in one of the plurality of computing systems. In response, it deploys the state data to the auxiliary computing system and reconnects the affected system to the auxiliary system. Some embodiments include a separate program memory device for storing program data, which can be loaded onto the auxiliary computing system. The processors may be implemented as FPGAs or microcontrollers, and one of them could serve as the auxiliary computing system.

18 Claims, 6 Drawing Sheets

ASYMMETRIC REDUNDANCY SYSTEM FOR COMPUTATION ON AUTONOMOUS VEHICLES

TECHNICAL FIELD

The field of the disclosure relates generally to computing redundancy on autonomous vehicles and, more specifically, asymmetric computing redundancy for autonomous vehicles.

BACKGROUND OF THE INVENTION

Autonomous vehicles employ a plurality of sensors, actuators, and computing systems to enable an autonomy system to interpret and respond to the environment around the autonomous vehicle. Specifically, the operational capability of the autonomous vehicle is directly related tied to the computing systems to make real time decisions and navigate the vehicle safely.

To maintain safe operation of the autonomous vehicle, autonomy systems typically employ redundancy procedures to maintain the operational integrity of the autonomous vehicle in the event of a system failure. System failures can lead to unsafe operation of the autonomous vehicle. Accordingly, conventional solutions achieve redundancy by deploying duplicate computational systems designed to assume control should the primary system fail. However, the conventional redundancy presents significant challenges including increased costs, complexity, and resource consumption due to the necessity for additional hardware components.

Computing systems often comprise multiple interconnected computing systems. Each of these systems may host one or more processors, with each processor potentially housing multiple cores. Faults and failures can occur at various levels of the computing hierarchy, potentially affecting a single computing system, an individual processor within that system, or even a single core within a processor. Traditionally, one conventional way to mitigate these risks is through symmetric redundancy for computing components. Symmetric redundancy includes duplicating computational resources and processes to create a seamless, fully redundant failover mechanism. In the event of a failure within a processor, for example a failure on a single core, the symmetric redundancy process ensures that there is an identical processor available to immediately take over the tasks of the failed processor without interrupting the overall system operation, regardless of the severity of the failure. Therefore, symmetric redundancy requires additional, but unused, computational overhead to facilitate the hardware requirements for providing a symmetrically redundant computing system. For example, conventional symmetric redundancy solutions will engage a full computing system backup upon detection of a failure in the primary computing system. This solution has limitations because any fault requires the deployment of an entire redundant computing system. This increases complexity of the system by requiring a full redundancy backup for point failures that may only be associated with a single processor of the computing system.

Employing symmetric redundancy results in inefficient storage utilization because a full redundant computing system must operating in parallel such that there is duplicate data stored across each redundancy layer. Additionally, conventional redundant layers will store program data and state data in the same location, meaning any redundancy layer would have to backup both state and program data, which increases the time to initiate the redundancy layer.

Accordingly, there is a need for more efficient solutions to satisfy redundant computing hardware requirements and streamline data management to enhance system recovery and ensure data integrity.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

A system of one or more computing systems are configured to perform particular operations by having software, firmware, hardware, or a combination thereof being installed and executing on the system that in operation, enables the system to execute the operations. In one aspect, the disclosed system for an asymmetric redundancy computing system includes a plurality of computing systems of an autonomy system. Each of the plurality of computing systems may include at least one memory device and at least one processor. The processor is configured to: write state data to a state memory device, receive data descriptive of the plurality of computing systems from the autonomy system, and process the data from the autonomy system. Accordingly, the asymmetric redundancy computing system provides the autonomy system. The system also includes an auxiliary computing system configured to: detect a condition within a computing system of the plurality of computing systems, write the state data from the state memory device to the auxiliary computing system, and reconnect the autonomy system to the auxiliary computing system.

In another aspect, the disclosed system for enabling asymmetric computing redundancy for an autonomy system a processor is configured to receive operational data of a plurality of computing systems. The processor is configured to: process the operational data to detect a condition within a computing system of the plurality of computing systems; validate program data of the computing system; identify a state memory device for the computing system; write state data from the state memory device to the computing system onto an auxiliary computing processor; and connect a sensor data stream processor to the auxiliary computing processor for the autonomy system. The system can thereby execute the autonomy system on the auxiliary computing processor.

In yet another aspect a method of providing asymmetric computing redundancy on an autonomous vehicle is provided. The method includes executing an autonomy platform on a first processor including: receiving sensor data from a plurality of sensors on the autonomous vehicle; generating state data by processing the received sensor data; writing the state data from the first processor to a state data memory device; detecting a condition on the first processor; initiating a redundancy procedure may include: loading the state data to a second processor from the state data memory device, and connecting the second processor to the plurality of sensors. The method further includes computing the autonomy platform on the second processor.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
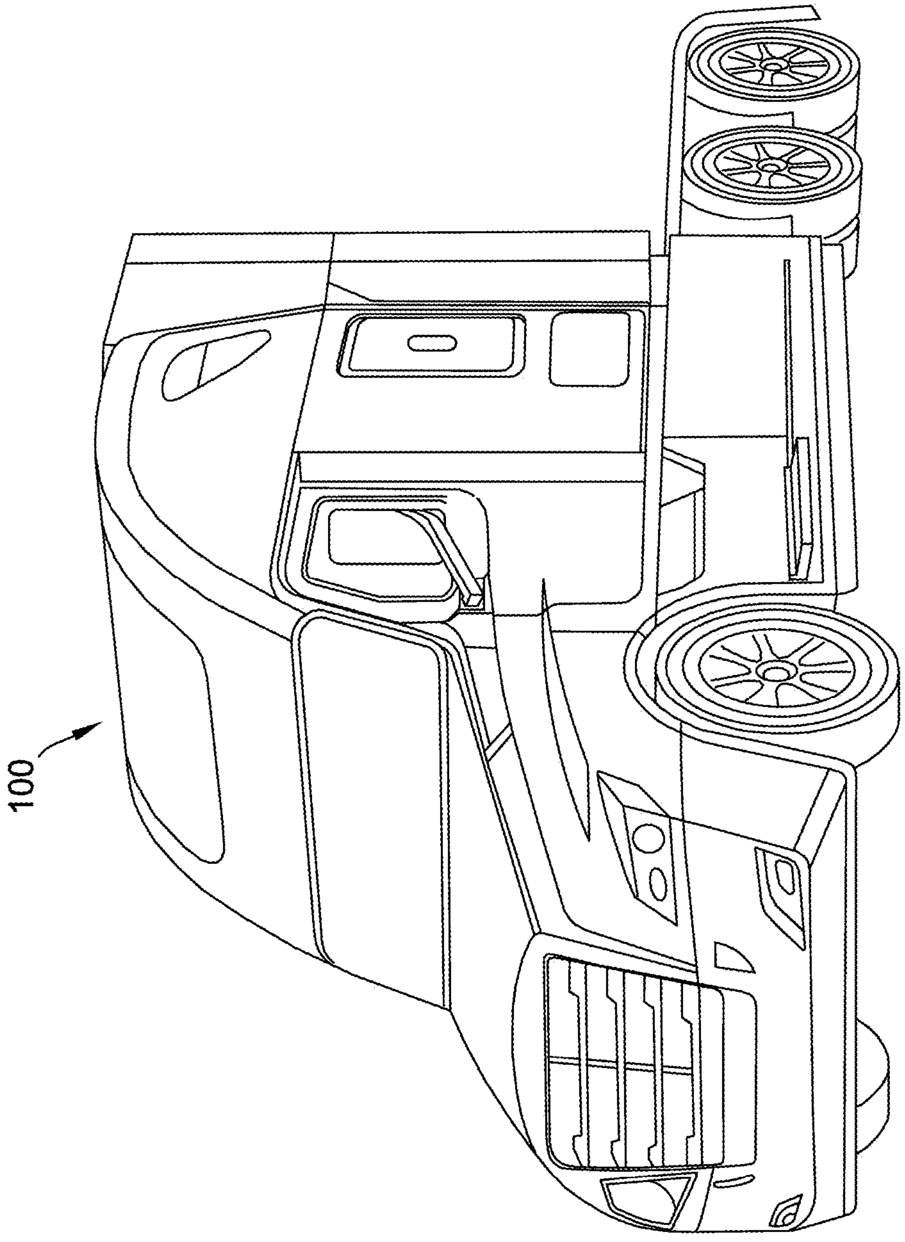
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

Systems and methods for asymmetric redundancy are disclosed. More specifically, the disclosed systems and methods provide component level asymmetric redundancy for an autonomy system, including deploying an auxiliary computing system without disruption to the autonomous vehicle upon detection of a condition within the autonomy system. The asymmetric redundancy system includes a state memory device and an auxiliary computing system. When a condition within the autonomy system is detected, the auxiliary computing system can retrieve state data from the state memory and connect to the sensor data stream from the plurality of sensors on the autonomy system to replace a computing system associated with the condition. The condition, for example, may be a processor malfunction, an auxiliary computing failure, or a data corruption.

Autonomous vehicles are required to meet safety requirements to operate. For example, there can be specific safety requirements on the component, sub-system, and system level. The portion of the autonomous vehicle associated with the safety standard can be required to meet error thresholds such as a failure rate threshold for components of the autonomous vehicle. For example, a computing system may be required to mitigate the error rate below a threshold associated with the safety standard to be used for autonomous operation.

The automotive safety integrity level (ASIL) rating system quantifies the level of risk posed by electrical and control systems to a potential safety impact on the autonomous vehicle. The ASIL rating associates the severity and complexity of an issue to the ability to control and remediate the issue. ASIL ratings vary from ASIL-A to ASIL-D with each level representing an increasing level of risk and safety associated with the capability of the autonomous vehicle. ASIL-A systems may pose a low potential for causing harm upon failure of the ASIL-A system that will minimally impact the operation of the autonomous vehicle. ASIL-B systems have a moderate potential for causing harm such that additional safety features are required to detect and mitigate failures of the ASIL-B rated system to maintain operation of the autonomous vehicle. ASIL-C system can pose a significant potential for causing harm and represent a critical safety implication. To meet ASIL-C requirements, extensive safety mechanisms, diagnostics, and redundancies to ensure both reliable and safe operation of the autonomous vehicle. ASIL-D rated systems can result in a catastrophic failure of the autonomous vehicle. Accordingly, ASIL-D rated systems require extensive testing, diagnostics, and redundancies to ensure safe operation of the autonomous vehicle.

To determine which ASIL rating is required, systems of the autonomous vehicle are evaluated based on the severity, exposure, and controllability of errors associated with the system. Accordingly, the severity and exposure of the errors are compared to the controllability of error to determine the required ASIL rating. For example, methodologies such as hazard analysis and risk assessment (HARA), fault tree analysis (FTA), event tree analysis (ETA), and failure modes, effects, and diagnostic analysis (FMEDA) can be used to quantify the ASIL rating required for an autonomous capability.

Once the required ASIL rating for an autonomous vehicle capability has been established, the autonomous vehicle can be verified against the requirements of the ASIL safety rating. In various embodiments, adding redundancies to components at a first safety rating can decrease the likelihood of failure and verify the capability for a higher ASIL rating than the individual components. For example, in certain embodiments of the present disclosure, components rated at a first safety rating can operate at a higher safety rating with proper testing, diagnostics, and redundancies in place. Accordingly, in various embodiments, the disclosed system utilizes an asymmetric redundancy for computing systems to reduce the error rate to adhere to the safety standards. The disclosed asymmetric redundancy reduces the error rate of the autonomy system by enabling a recovery for each computing system in the autonomy system. Asymmetric redundancy reduces the total computational hardware required to facilitate the autonomy system by eliminating the need for duplicative hardware necessitated in symmetric redundancy computing systems. The asymmetric redundancy enables auxiliary computing systems to provide component level redundancy to the autonomy system. Asymmetric redundancy utilizes a dynamic component capable of replacing all components of a system to provide redundancy. For example, the asymmetric redundancy system includes a processor that is deployed to any module of the autonomy computing system when a condition is detected. By reallocating tasks on the component level using the asymmetric redundancy system, the system optimizes resource usage and eliminates the need for duplicative hardware. Component level autonomy improves the efficiency of the autonomy system by lowering the system error rate through the application of component level redundancies. For example, the auxiliary computing system can detect a condition associated with a computing system. In various embodiments, the condition effects a processor on the autonomy computing system. For example, the condition includes a processor malfunction, an auxiliary computing system failure, or a data corruption on the autonomy system. The condition may affect the operation of the autonomy system and can be detected by the auxiliary computing system to identify the condition.

In various embodiments, each computing system within the autonomous vehicle writes state data to their respective state memory device. The state data is written to the computing system and the state memory device backup. Each of the computing systems is connected to the autonomy system. For example, a computing system may interpret sensor data from a plurality of sensors. The plurality of sensors collects the sensor data from the environment surrounding the autonomous vehicle. The plurality of sensors collect data processed by the autonomy computing system to classify driving conditions surrounding the autonomous vehicle. In various embodiments, the driving conditions processed from the sensor data correspond to traffic, road conditions, or other vehicles around the autonomous vehicle. In various embodiments, a computing system is connected to a sensor data stream processor or an autonomy system. Accordingly, the state data for each processor is based on the current operational configuration of the computing system. State data is data associated with the current condition or status of a computing system. State data includes variables, configurations, current operations, or other forms of dynamic data that contribute to the operational state of the computing system. Storing the state data on a state memory provides a redundancy preserving nominal state data for a computing device. The state memory device can load the saved state data to restore the operating state of a first computing system onto a second computing system. Accordingly, when a computing system experiences a condition, the operational state of the hardware can be transferred onto an auxiliary computing system to restore the functional operation of the autonomy system.

In certain embodiments, the auxiliary computing system monitors the computing systems used for the autonomy system to identify a condition within a computing system. The auxiliary computing system includes a processor and a memory device. In various embodiments, the auxiliary computing system may include a monitor module. The monitor module is executed on the auxiliary compute system to receive and process data from the computing systems providing the autonomy computing system to detect and identify a condition. In various embodiments, the monitor module is be configured to process data from the autonomy system to detect the condition. The data processed by the monitor module includes The monitor module generally requires only a portion of the computing capacity the auxiliary computing can provide. The monitor module requires less computational resources from the auxiliary system than the autonomy system. Accordingly, the auxiliary compute system can run in a low power mode when executing the monitor module for the autonomy system. When a condition is detected, the auxiliary computing system may reload program data and state data onto the computing system experiencing the condition. In various embodiments, the program data may be stored on a program memory device. The program data includes, for example, diagnostic data from the autonomy computing system. The program memory device includes compartmentalized memory devices independent from the computing systems. In various embodiments the program memory device is configured to load program data onto the auxiliary computing system based on the detected condition. Accordingly, the auxiliary computing system loads program data from the program memory device corresponding to the program data utilized by the computing system affected by the condition. Additionally, the auxiliary computing system is deployed to replace the computing system associated with the condition. The auxiliary computing system loads the state data of the computing system associated with the condition and operates as a substitute for the computing system to maintain a nominal operating status for the autonomy system. The auxiliary computing system can be connected to computing systems of the autonomy system. For example, in certain embodiments, the auxiliary computing system connects to a plurality of sensors of the autonomy system to replace the computing system affected by the condition. Accordingly, storing the state data of the computing system on a state memory device enables the auxiliary computing to replace the computing system when a condition is detected without impact to the operation of the autonomy system.

Asymmetric redundancy reduces the hardware required to operate autonomous vehicles at predefined safety ratings. The asymmetric redundancy system monitors the autonomy system to detect a condition effecting the operation of the autonomy system and eliminates the need for parallel redundancy. In various embodiments, the condition includes errors, a component level failure, faults, computer system hardware failure, etc. When the condition is detected, the system, in certain embodiments, attempts to reload state data and program data onto the computing system associated with the fault. The component fault may include, for example, a computing system hardware failure. The system identifies the component level fault and replace it with the auxiliary computing to provide a redundancy capability to the autonomy system. Utilizing the auxiliary computing system enables continued operation of the autonomy system in response to the detection of a condition, avoiding initiation of minimum risk maneuver in response to the condition that terminates the operation of the autonomous vehicle.

The asymmetric redundancy system provides a component level asymmetric redundancy eliminating the need for parallel redundancy that requires duplicative hardware to achieve a required failure rate for a safety rating. The asymmetric redundancy system thereby decreases the hardware requirements for facilitating the operation of the autonomous vehicle. More specifically, the asymmetric computing system eliminates the need for fully duplicative redundancy computing hardware. For example, an auxiliary computing system can replace a faulty computing system of the autonomy system without having to implement a fully redundant autonomy system.

Figure 2:
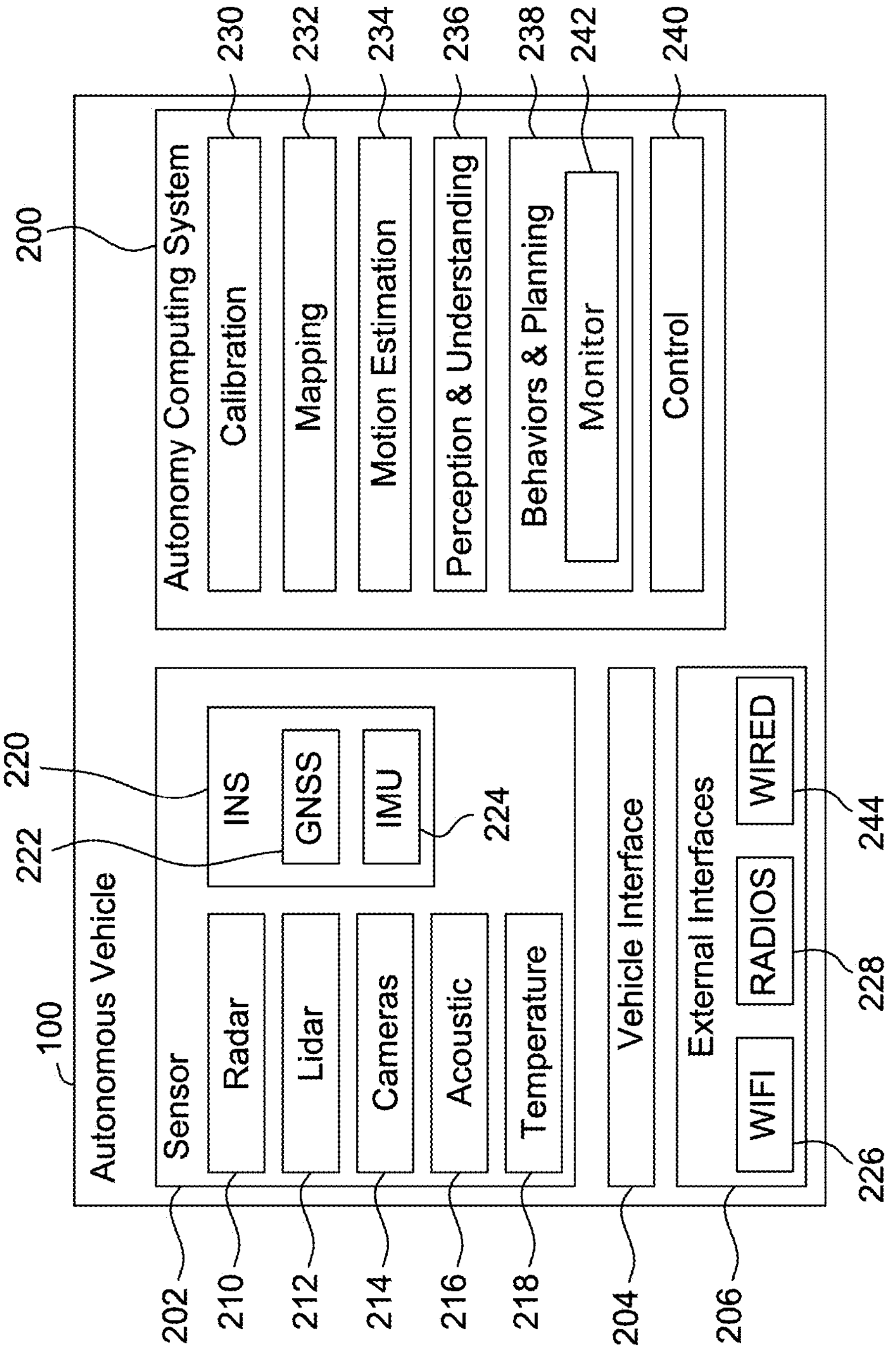
FIG. 2 is a block diagram of an autonomous vehicle.

In certain embodiments, the autonomy system includes a plurality of computing systems, each computing system includes a processor and a memory device. The computing systems facilitate the autonomy system by providing the processing capacity to facilitate the operation of the autonomy system. To provide asymmetric redundancy at the component level, the system separates the storage of state data, program data, and sensor data. Separating the state data, program data, and sensor data enable the system to implement the redundancies using the auxiliary computing system without affecting the operation of the autonomous vehicle. FIG. 1 is a schematic diagram of an autonomous vehicle 100. FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 120 to determine how to control operation of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding autonomous vehicle 100. In some embodiments, the image data generated by cameras 214 may be sent to autonomy computing system 200 or other aspects of autonomous vehicle 100, and this image data may include autonomous vehicle 100 or a generated representation of autonomous vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. Radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around autonomous vehicle 100.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and a monitor module 242. The monitor module 242, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3:
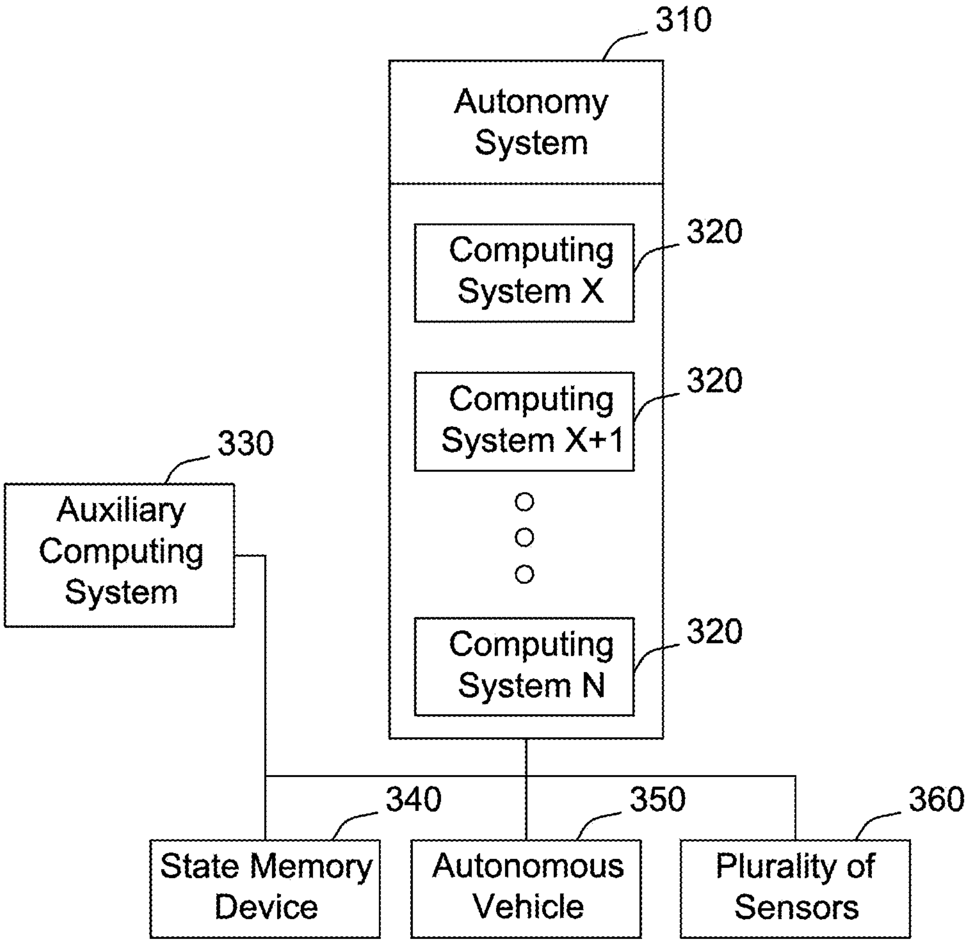
FIG. 3 is a block diagram of the asymmetric redundancy system.

FIG. 3 is a block diagram of one embodiment of the asymmetric redundancy system. The system includes an autonomy system 310. The autonomy system 310 includes a plurality of computing systems 320. Each of the plurality of computing systems 320 includes a processor and a memory. The plurality of computing systems 320 are connected to an auxiliary computing system 330 and a state memory device 340. In certain embodiments, the auxiliary computing system 330 is configured to monitor the operating status of the plurality of computing systems 320 of the autonomy system 310. For example, the auxiliary computing system 330 monitors the autonomy system 310 for a condition associated with one or more of the plurality of autonomy computing systems 320. The condition may be, for example, a processor malfunction, an auxiliary computing system failure, or a data corruption. Upon detection of the condition, the auxiliary computing system 330 loads state data from the state memory device 340. The state memory device 340 includes a memory device for storing state data backups for the plurality of autonomy computing systems 320. Moreover, state memory device 340 includes one or more computer readable media, such as, without limitation, dynamic random-access memory (DRAM), static random-access memory (SRAM), a solid-state disk, or a hard disk. For example, state memory device 340 may include multiple storage units such as hard disks or solid-state disks in a redundant array of independent disks (RAID) configuration. In some embodiments, state memory device 340 may include a storage area network (SAN) or a network attached storage (NAS) system.

The state memory device 340 enables the auxiliary computing system 330 to load state memory device data corresponding to an autonomy computing system 320 prior to the detection of the condition. To replace the autonomy computing system 320 associated with the condition, the auxiliary computing system 330 connects to the autonomy system 310 on the autonomous vehicle 350 and the plurality of sensors 360. Specifically, the auxiliary computing system 330 replicates the connection to the plurality of sensors 360 and the autonomy system 310. The sensor data captured by the plurality of sensors 360 provide a data stream to the auxiliary computing system 330. The sensor data from the plurality of sensors 360 is processed by a computing system 320 connected to the autonomy system 310. When a condition is detected on a computing system 320 of the autonomy system 310, the auxiliary computing system 330 connects to the plurality of sensors 360. Specifically, the auxiliary computing system 330 connects to the autonomy system 310 and the plurality of sensors 360 upon detection of the condition. In various embodiments, the auxiliary computing system 330 connects to the autonomy system 310 and the plurality of sensors 360 at a rate to prevent the detected condition from manifesting and affecting the operation of the autonomous vehicle 350.

Figure 4:
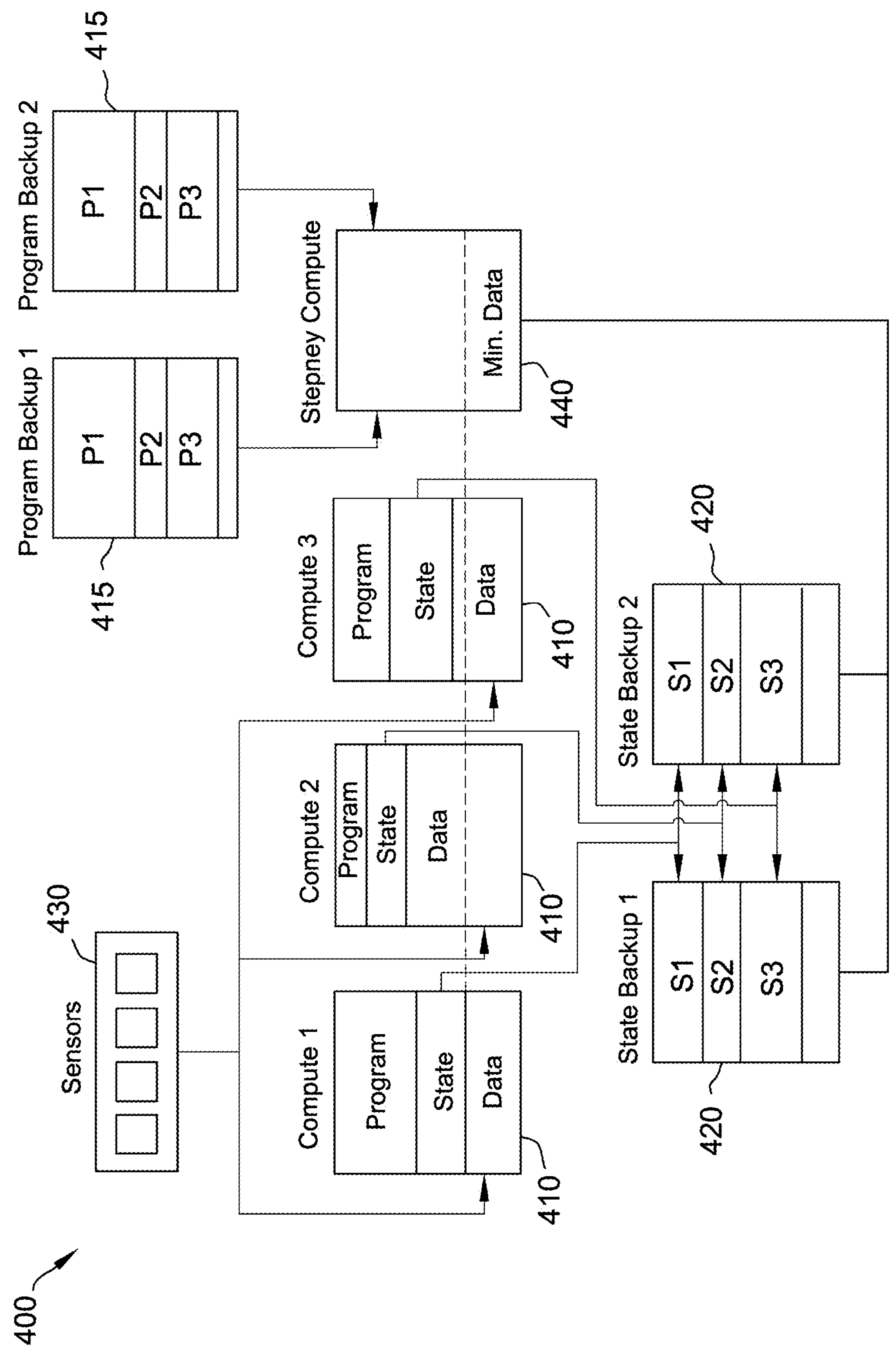
FIG. 4 is a block diagram of an additional embodiment of the disclosure.

FIG. 4 is a block diagram of another embodiment of an asymmetric redundancy computing system 400. The asymmetric redundancy computing system 400 includes a plurality of computing systems 410. Each computing system 410 includes program data, state data, and operating data. The program data includes, for example, an executable software program associated with the computing system. Additionally, the program data may include configuration settings, calibration data, autonomy instructions, emergency protocols, and diagnostic protocols. The program data of the computing systems 410 may be stored on a program backup 415. The state data includes transient data for operating state of the computing system. The plurality of computing systems 410 are connected to a state backup 420. Additionally, the autonomy system may process sensor data collected by a plurality of sensors 430 and transmitted to the computing systems 410. The plurality of sensors 430 are connected to the auxiliary computing system 440 upon detection of the condition to maintain operation of the autonomy system.

The asymmetric redundancy computing system 400 includes an auxiliary computing system 440. The auxiliary computing system 440 is connected to the plurality of computing systems 410. The auxiliary computing system 440 monitors the operation of the computing systems 410 to detect the condition. The condition includes a processor malfunction, an auxiliary computing system failure, or a data corruption. The auxiliary computing system 440 processes at least one of: the program data, the state data, or the sensor data to identify the condition associated. In various embodiments, the auxiliary computing system 440 identifies a condition with one or more of the plurality of computing systems 410. The auxiliary computing system 440 may require a minimum amount of data to monitor the plurality of computing systems. The minimum amount of data required to operate the auxiliary computing system 440 is less than required for a computing system 410 connected to the autonomy system. Accordingly, the auxiliary computing system 440 operates on a low power mode when monitoring the computing systems 410 to detect the condition. In certain embodiments, the auxiliary computing system 440 is connected to the plurality of program backups 415. The plurality program backup 415 may load program data onto the auxiliary computing system when a condition is detected. In various embodiments, the program data may be preloaded on the auxiliary computing system 440.

Figure 5:
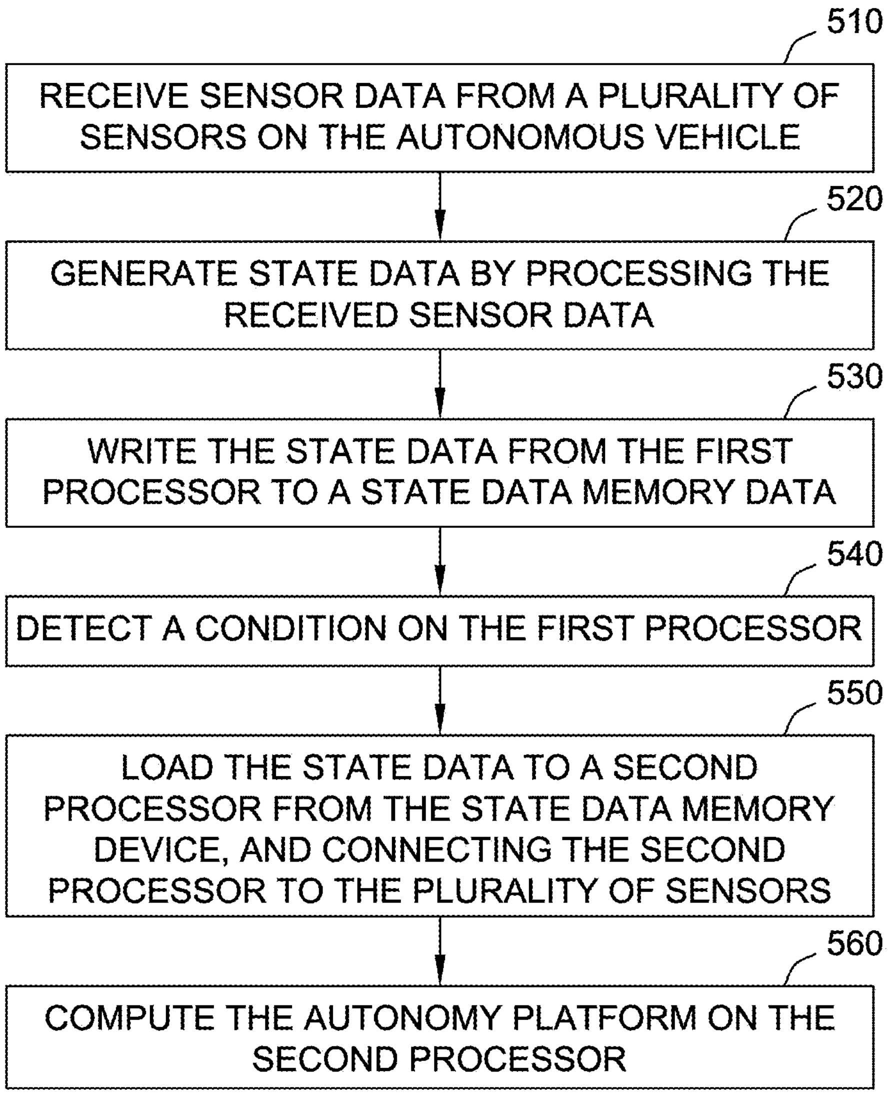
FIG. 5 is a flow chart of a method of providing asymmetric computing redundancy.

FIG. 5 is a flow chart of a method 500 of providing asymmetric computing redundancy. Method 500 may be implemented using autonomy system 200 (shown in FIG. 2) of autonomous vehicle 100 (shown in FIG. 1). In one example embodiment, method 500 includes receiving 510 sensor data from a plurality of sensors on the autonomous vehicle. Method 500 also includes generating 520 state data by processing the received sensory data. Method 500 further includes writing 530 the state data from the first processor to a state data memory device. Method 500 still further includes detecting 540 a condition on the first processor. The condition may be associated with a processor malfunction, an auxiliary computing system failure, or a data corruption. Method 500 also includes loading 550 the state data to a second processor from the state data memory device and connecting the second processor to the plurality of sensors. In various embodiments, the second processor corresponds to the auxiliary computing system. The auxiliary computing system may access a state memory device to load the state data onto the device. Storing the state data separate from the program data enables reduced boot time for the auxiliary computing system. Method 500 then also includes computing 560 the autonomy platform on the second processor.

Figure 6:
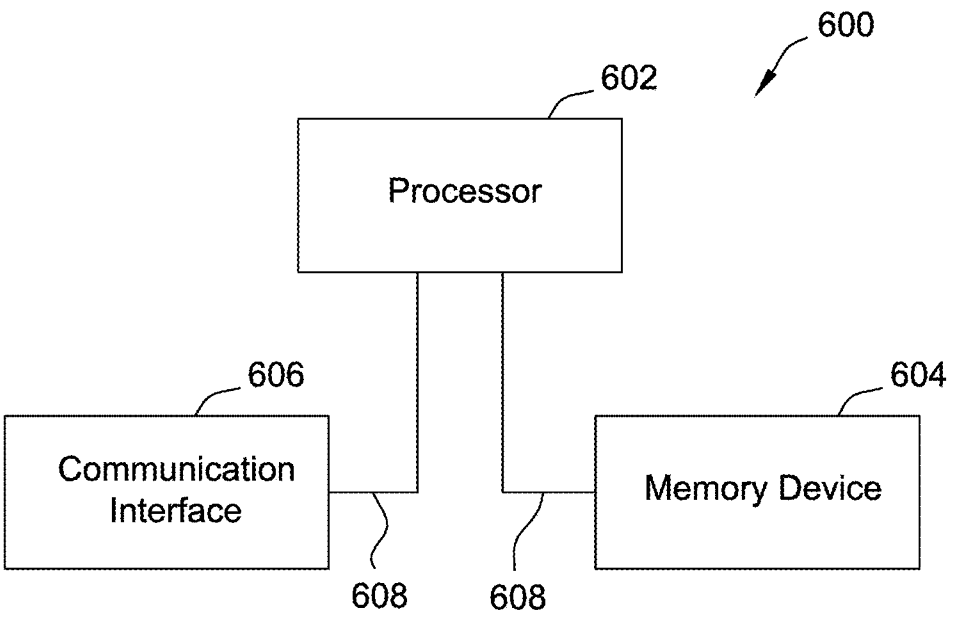
FIG. 6 is a block diagram of an example computing device.

FIG. 6 is a block diagram of an example computing device 600. Computing device 600 includes a processor 602 and a memory device 604. The processor 602 is coupled to the memory device 604 via a system bus 608. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 604 includes one or more devices that enable information, such as executable instructions or other data (e.g., sensor data), to be stored and retrieved. Moreover, the memory device 604 includes one or more computer readable media, such as, without limitation, dynamic random access memory (DRAM), static random access memory (SRAM), a solid state disk, or a hard disk. In the example embodiment, the memory device 604 stores, without limitation, application source code, application object code, configuration data, additional input events, application states, assertion statements, validation results, or any other type of data. The computing device 600, in the example embodiment, may also include a communication interface 606 that is coupled to the processor 602 via system bus 608. Moreover, the communication interface 606 is communicatively coupled to data acquisition devices.

In the example embodiment, processor 602 may be programmed by encoding an operation using one or more executable instructions and providing the executable instructions in the memory device 604. In the example embodiment, the processor 602 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the methods, systems, and apparatus described herein includes at least one of: reduced hardware requirements for the autonomy system, and increased reliability of the computing system hardware running the autonomy system Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A system for computing asymmetric computing redundancy, the system comprising:

a plurality of computing systems of an autonomy system, wherein each of the plurality of computing systems comprises at least one memory device and at least one processor, the at least one processor configured to:

write state data to a state memory device, the state memory device separate from the plurality of computing systems;

receive data descriptive of the plurality of computing systems from the autonomy system;

process the data from the autonomy system; and execute the autonomy system; and an auxiliary computing system separate from the plurality of computing systems and configured to:

detect a condition within a computing system of the plurality of computing systems, the detected condition impairing functional operation of the autonomy system; and in response to detection of the condition, write the state data from the state memory device to the auxiliary computing system; and restore the functional operation of the autonomy system by computing an autonomy platform on the auxiliary computing system, based on the state data.

2. The system of claim 1, wherein the auxiliary computing system is a monitor module for the autonomy system.

3. The system of claim 1, further comprising connecting the auxiliary computing system to a plurality of sensors of the autonomy system.

4. The system of claim 1, wherein the condition comprises: at least one of a processor malfunction, an auxiliary computing failure, or a data corruption.

5. The system of claim 1, wherein the auxiliary computing system is further configured to execute program data from a program memory device.

6. The system of claim 5, wherein the program data is stored on a program memory device; and wherein the program memory device and the state memory device are compartmentalized from each other.

7. The system of claim 1, wherein the plurality of computing systems include at least one of an FPGA or a microcontroller.

8. A system for enabling asymmetric computing redundancy for an autonomy system, the system comprising:

a processor configured to receive operational data of a plurality of computing systems, the processor configured to:

process the operational data to detect a condition within a computing system of the plurality of computing systems, the detected condition impairing functional operation of the autonomy system;

validate program data of the plurality of computing systems;

identify a state memory device for the plurality of computing systems, the state memory device separate from the plurality of computing systems;

write state data from the state memory device onto an auxiliary computing processor, the auxiliary computing processor separate from the plurality of computing systems; and connect a sensor data stream processor to the auxiliary computing processor for the autonomy system; and execute the autonomy system on the auxiliary computing processor to restore the functional operation of the autonomy system, based on the state data.

9. The system of claim 8, wherein the processor is a monitor module for the autonomy system.

10. The system of claim 8, further comprising a sensor suite processor associated with the autonomy system.

11. The system of claim 8, wherein the condition includes at least one of a processor malfunction, an auxiliary computing failure, or a data corruption.

12. The system of claim 8, wherein the processor is further configured to load program data onto the auxiliary computing processor.

13. The system of claim 12, wherein the program data is stored on a memory device separate from the state memory device.

14. A method of providing asymmetric computing redundancy on an autonomous vehicle, the method implemented by an autonomy computing system of an autonomous vehicle, the method comprising:

executing an autonomy platform on a first processor comprising:

receiving sensor data from a plurality of sensors on the autonomous vehicle;

generating state data by processing the received sensor data;

writing the state data from the first processor to a state data memory device, the state data memory device separate from a plurality of computing systems of the autonomy computing system;

detecting a condition on the first processor, the detected condition impairing functional operation of the autonomy computing system;

in response to detection of the condition, initiating a redundancy procedure comprising:

loading the state data to a second processor from the state data memory device, and connecting the second processor to the plurality of sensors; and restoring the functional operation of the autonomy computing system by computing the autonomy platform on the second processor, based on the state data.

15. The method of claim 14, further comprising loading program data onto the second processor.

16. The method of claim 14, wherein the condition includes at least one of a processor malfunction, an auxiliary computing failure, or a data corruption.

17. The method of claim 14, wherein the redundancy procedure prevents the autonomy platform from performing a minimum risk maneuver in response to detecting the condition.

18. The method of claim 14, further comprising detecting the condition on the first processor with the second processor.

* * * * *